United States Patent
Stuchell

(10) Patent No.: US 6,759,078 B2
(45) Date of Patent: Jul. 6, 2004

(54) ASEPTIC CREAM SUBSTITUTE

(75) Inventor: Yvonne M. Stuchell, Decatur, IL (US)

(73) Assignee: CP Kelco U.S., Inc., Wilmington, DE (US)

( * ) Notice: Subject to any disclaimer, the term of this patent is extended or adjusted under 35 U.S.C. 154(b) by 141 days.

(21) Appl. No.: 10/166,735

(22) Filed: Jun. 12, 2002

(65) Prior Publication Data

US 2003/0087001 A1 May 8, 2003

Related U.S. Application Data

(60) Provisional application No. 60/297,781, filed on Jun. 14, 2001.

(51) Int. Cl.$^7$ .............................. A23L 1/19; A23L 1/39; A23C 15/12
(52) U.S. Cl. ........................ 426/656; 426/602; 426/589
(58) Field of Search ................................ 426/589, 656, 426/602

(56) References Cited

U.S. PATENT DOCUMENTS

| | | | |
|---|---|---|---|
| 4,985,270 A | | 1/1991 | Singer et al. |
| 5,478,587 A | | 12/1995 | Mingione |
| 5,480,670 A | * | 1/1996 | Pordy .......................... 426/580 |
| 5,858,441 A | | 1/1999 | Reddy et al. |
| 2001/0003598 A1 | | 6/2001 | Cherian et al. |

* cited by examiner

Primary Examiner—Anthony Weier
(74) Attorney, Agent, or Firm—Banner & Witcoff Ltd.

(57) ABSTRACT

An aseptic cream substitute comprising a composition of water, a dry blend, and a meltable oil or fat, wherein the dry blend comprises microparticulated and denatured whey protein concentrate and xanthan gum, wherein the composition is pasteurized and then homogenized to produce the aseptic cream substitute.

23 Claims, No Drawings

ASEPTIC CREAM SUBSTITUTE

This application is a continuation-in-part of U.S. Provisional Patent application Serial No. 60/297,781, filed Jun. 14, 2001, which is hereby incorporated by reference in its entirety.

FIELD OF THE INVENTION

The invention is directed to an aseptic cream substitute.

BACKGROUND OF THE INVENTION

Chefs use dairy creams everyday in the preparation of food. However, chefs have also been substituting artificial creams for dairy creams to save money, for ease of handling, for improved shelf-life, or to provide nondairy fat alternatives. For example, Minor's Culinary Cream™ is a refrigerated commercial cream substitute for the food service market produced by Nestle. A blend of SIMPLESSE 100, gelatin, xanthan gum, and alginate is used to stabilize the cream substitute. The substitute creams must exhibit at least comparable performance to dairy creams to be commercially viable.

Like dairy creams, artificial cream substitutes are stabilized aqueous dispersions of an edible fat. Extended shelf-life is only possible with sterile processing and packaging to prevent microbial spoilage. Butter fat and milk proteins may be present, together with natural or artificial emulsifiers. Artificial creams may also require oxidation stabilizers, such as BHA or BHT, or thickening agents, such as hydrocolloids and starches, and salts such as phosphates as a buffer control against pH changes that may destabilize the emulsion.

It is still desirable to reduce the overall cost of the current culinary products without changing the desired properties of the cream substitute. It is also desirable to develop a shelf-stable product that is processed aseptically, reducing the need for refrigeration, and extending the shelf-life of the finished product. Great Britain Patent 2,205,726 describes one such product which is a dispersion in an aqueous phase of edible fat, an emulsifier composition and protein, wherein the fat comprises vegetable butter or lauric fat having a solids content at 35° C. at most about 5%, and at 25° C. of at least 5%, and at 15° C. a solid content which is greater by an additional 50%.

Published U.S. patent application U.S. 2001/0003598 A1 describes a gelatin free cream substitute comprising the combination of 5% to about 40% by weight butter, from about 0.25% to about 5% by weight of a thickening agent, and from about 0.25% to about 4% by weight of a food protein based on total weight of the cream substitute. The thickening agent may be a starch or food acceptable gum such as xanthan gum, guar gum, gum Arabic, carrageenan, gellan gum, locust bean gum, gum gatti, gum tragacanth, agar, algin, sodium alginate, potassium alginate, propylene glycol alginate, or a mixture thereof. The food protein may be soy, rice, pea, or milk protein, or a dairy protein such as whey protein concentrate, whey protein isolate, or casein.

The published application includes standard whey protein concentrate as a possible food protein used to produce the gelatin-fee cream substitute. However, culinary cream substitutes that are prepared with standard whey protein concentrate display the undesired characteristic of forming strong aggregates or gelling when heated.

BRIEF SUMMARY OF THE INVENTION

It was discovered that an aseptic cream substitute can be prepared having improved heat and shelf stability over similar culinary cream substitutes prepared with standard whey protein concentrate. In particular, it was discovered that if microparticulated and denatured whey protein concentrate is used in place of the typical whey protein concentrate, a superior formulation can be prepared. A comparison between cream substitutes made with standard whey protein concentrate and cream substitutes made with microparticulated and denatured whey protein concentrate shows that the latter performed significantly better in both a functional test, which evaluates the performance of the cream substitute at low pH environments and a butter stability test, which evaluates the ability of the cream substitute to emulsify as butter was melted into it.

Using microparticulated and denatured whey protein concentrate to prepare aseptic cream substitutes results in texture enhancement; increased creaminess; superior emulsion stability; UHT, retort and steam heat stability; flexibility in both high and low pH formulations; uniform moisture distribution; and improved stability/texture when used in frozen desserts.

The invention is directed to an aseptic cream substitute comprising a composition of water, a dry blend, and a meltable oil or fat, wherein the dry blend comprises microparticulated and denatured whey protein concentrate and xanthan gum, wherein the composition is pasteurized and then homogenized to produce the aseptic cream substitute.

The invention is particularly directed to a cream substitute wherein the meltable oil or fat is butter.

The invention also relates to a foodstuff that contains the cream substitute of the invention.

DETAILED DESCRIPTION OF THE INVENTION

The present invention is directed to an aseptic cream substitute. It was discovered that cream formulations containing microparticulated and denatured whey protein concentrate, such as SIMPLESSE 100, and low amounts of xanthan gum (less than 0.90 wt % of the total weight of the cream substitute formulation) provide a satisfactory cream substitute.

The cream formulations may also contain an additional amount of gelling hydrocolloids. Formulations containing less than 0.1 wt % of the total weight of the cream substitute formulation provides additional thickening and stability. Formulations containing higher levels of gelling hydrocolloids, e.g. 0.2%–0.5%, result in creams with very structured, gelled consistency that may perform suitably in culinary applications where a gelled texture in the finished food product provides added benefits and shelf life.

The aseptic cream substitute of the invention is prepared by combining a blend of dry ingredients with water and a meltable fat or oil. In particular, microparticulated and denatured whey protein concentrate and xanthan gum are mixed to form a dry blend. The dry blend is added to heated water. Melted butter or other meltable fat or oil is added to the heated water and blended.

Dry Blend:

| | |
|---|---|
| 50–90% | Microparticulated and denatured whey protein concentrate |
| 10–30% | Xanthan gum |

Cream substitute

| | |
|---|---|
| 65–80% | Water |
| 3–6% | Dry Blend |
| 15–45% | Butter or other meltable fat or oil |

The microparticulated and denatured whey protein concentrate is preferably SIMPLESSE 100. SIMPLESSE is whey protein concentrate that has undergone a proprietary process to completely denature the protein and form microparticles. SIMPLESSE 100 is 53–55% protein, with the remainder being mostly lactose and a small amount of ash, fat and moisture.

SIMPLESSE functionality is different from native whey protein concentrate (WPC) because it is microparticulated in addition to being completely denatured. It doesn't form strong aggregates or gel when heated like WPC. The microparticles and denatured protein molecules contribute to texture enhancement; increased creaminess; superior emulsion stability; UHT, retort and steam heat stability; flexibility in both high and low pH formulations; uniform moisture distribution; and improved stability/texture when used in frozen desserts.

Comparison tests were conducted between cream substitutes made with WPC and those made with microparticulated and denatured whey protein, specifically SIMPLESSE. The different cream substitutes performed equally in the cold product evaluation test, the hot product evaluation test and the heat-smashing test. The latter, however, outperformed the former in both the functional test and the butter stability test. In the functional test, the cream substitute was evaluated based on the amount of curdling displayed at low pH environments. The cream substitute containing WPC displayed significant curdling whereas the cream substitute containing SIMPLESSE did not. In the butter stability test, the cream substitute was evaluated based on its ability to emulsify as butter was melted into it. Again, the cream substitute containing WPC performed noticeably worse than the cream substitute made with SIMPLESSE. Specifically, the cream substitute made with WPC failed to emulsify when butter was melted into it.

Microparticulated and denatured proteins other than SIMPLESSE may be used. The microparticulated and denatured whey protein concentrate concentration comprises about 50 wt % to about 90 wt % of the dry blend, preferably about 65 wt % to about 85 wt %, more preferably about 70 wt % to about 83 wt %, and most preferably 73 wt % to about 80 wt %.

Additional proteins can be blended with the microparticulated and denatured whey protein concentrate, such as whey or soy protein concentrate, gelatin, and caseins, to increase the protein content of the cream and provide additional functional benefits. These can comprise about 1 wt % to about 50 wt % of the dry blend, preferably about 5 wt % to not more than about 25 wt %.

The xanthan gum may be any suitable xanthan gum such as Keltrol manufactured by CP-Kelco. The xanthan gum should be food grade without strong odors or flavor, without microbial contamination, have neutral pH when mixed with water and produce high viscosity when fully hydrated. The xanthan gum concentration comprises about 10 wt % to about 30 wt % of the dry blend, preferably about 15 wt % to about 28 wt % of the dry blend, and more preferably 20 wt % to 25 wt % of the dry blend.

Additional stabilizers and thickeners may be used and include, but are not limited to, locust bean gum, guar gum, gellan gum, cellulose and cellulose derivatives such as sodium carboxymethyl cellulose (CMC), alginates, carrageenan, gelatin, gum arabic, gum tragacanth, and tara gum. They can either be gelling or non-gelling (thickening) hydrocolloids. There are different types or varieties of the stabilizers and thickeners and one skilled in the art would know what type to select to obtain the desired cream properties. For example, gellan gum may be obtained in different forms with different properties and selecting a particular form for desired property is within the skill of the art.

The stabilizers and thickeners are used in amounts effective to modify the final texture of the cream substitute to achieve the desired functional properties. The amounts of stabilizers and thickeners are very low, below about 1 wt %, typically below 0.4 wt %, and even as low as 0.01 wt % in the total formulation.

Preferably, butter is used in the cream substitute. Also preferably, the butter is unsalted. This allows the salt content of the final food products, such as sauces, to be determined by the chef. Additionally, it allows the cream substitute to be used in sweet products such as desserts where salt is used in very low amounts. A combination of salted butter and unsalted butter could be used. Other meltable fats and oils can be used in this system such as vegetable oils (canola, soybean, olive, palm) and animal fats (lard, tallow). Preferably the fat level of the cream substitute is about 10 wt % to about 45 wt %.

Although not required, the aseptic cream substitute may contain preservatives such as found in refrigerated cream substitutes and commonly used in food products, e.g. citric acid, potassium sorbate or sodium benzoate. In addition, oxidation stabilizers such as BHA or BHT may be used. Preferably no preservatives are added. Moreover, no emulsifiers are necessary to produce the aseptic cream substitute, however, they may be included if desired.

Additional ingredients may optionally be added in order to enhance the flavor of the cream substitute. Optional ingredients may include, but are not limited to, sweeteners, such as sucrose, fructose, lactose, maltodextrins, and artificial sweeteners, or flavorants, such as cream flavor, butter flavor, milk flavor, or other dairy flavors.

The cream substitute may be prepared by first blending the dry ingredients together to form a dry blend. The dry blend is then added to cold or heated water. The dry blend is preferably added to the water with high shear and stirred until all dry ingredients are incorporated, approximately 30 seconds to 5 minutes. Preservatives, if used, are then added. The mixture is then stirred for approximately 5 to 15 minutes, typically about 10 minutes and until all ingredients are incorporated and no lumps of dry ingredients are evident. Melted butter or other melted fat or oil is added and stirred for about 3 to 5 minutes.

The cream substitute is homogenized, pasteurized, and cooled. For example, the cream is first preheated to a temperature of about 180° F. to about 220° F., preferably about 210° F., for about 1 minute. The cream is then heated to a final temperature of about 260° F. to about 300° F., preferably about 285° F. to about 290° F., for about 6 to 15 seconds before cooling is initiated. Preferably two-stage homogenization at pressures typical for dairy creams are used, more preferably the homogenizer operates about 2000 psi for the first stage and 500 psi for the second stage (2500 psi total).

The cream substitute of the invention may be used in food products normally containing cream and/or butter or margarine as well as a fat or oil in an emulsified form, such as culinary products, e.g., sauce, gravy, or soup, in desserts, e.g., cream-filled pastry, in drinks, as a component of salad dressings, particularly the so-called "creamy dressings," as well as fillings in pies, crepes and "pockets." These products are collectively referred to herein as "foodstuffs."

The present invention therefore is also directed to a "foodstuff" comprising a cream substitute of the present invention. The cream substitute of the present invention may replace some or preferably all of the cream that is normally present in such foodstuff.

The amount cream substitute present in the foodstuff may be from 1% to 80% by weight, preferably from 5% to 45% by weight and more preferably from 10% to 40% by weight based on the weight of the foodstuff.

EXAMPLE 1

The composition for each cream substitute is shown in the tables below. Two batches were made for each formulation, and combined prior to processing and homogenization. All batches contained 24% melted unsalted butter, 0.2% potassium sorbate, and 0.04% citric acid.

| | A % | B % | C % | D % | E % | F % | G % | H % |
|---|---|---|---|---|---|---|---|---|
| Dry Blend: | | | | | | | | |
| SIMPLESSE 100 | 76.5 | 61.9 | 57.8 | 38.2 | 80.3 | 76.0 | 77.7 | 75.8 |
| Gelatin | 0 | 19.1 | 22.2 | 0 | 0 | 0 | 0 | 0 |
| Whey protein concentrate | 0 | 0 | 0 | 38.2 | 0 | 0 | 0 | 0 |
| Xanthan gum | 23.5 | 19.1 | 17.8 | 23.6 | 19.1 | 23.4 | 18.5 | 23.3 |
| Gellan gum | 0 | 0 | 0 | 0 | 0 | 0 | .75 | .87 |
| Carboxy-methyl-cellulose | 0 | 0 | 2.2 | 0 | 0 | 0 | 0 | 0 |
| Locust bean gum | 0 | 0 | 0 | 0 | 0.6 | 0.6 | 0 | 0 |
| Sodium citrate | 0 | 0 | 0 | 0 | 0 | 0 | 3.0 | 0 |
| Cream: | | | | | | | | |
| Water | 72.4 | 71.6 | 71.3 | 72.4 | 72.5 | 72.3 | 72.4 | 72.3 |
| Dry Blend | 3.4 | 4.2 | 4.5 | 3.4 | 3.2 | 3.4 | 3.4 | 3.4 |
| Butter, melted | 24.0 | 24.0 | 24.0 | 24.0 | 24.0 | 24.0 | 24.0 | 24.0 |
| Potassium-sorbate | 0.2 | 0.2 | 0.2 | 0.2 | 0.2 | 0.2 | 0.2 | 0.2 |
| Citric acid | 0.04 | 0.04 | 0.04 | 0.04 | 0.04 | 0.04 | 0.04 | 0.04 |
| Amount of Dry Blend Ingredient in final Cream: | | | | | | | | |
| SIMPLESSE 100 | 2.6 | 2.6 | 2.6 | 1.3 | 2.6 | 2.6 | 2.6 | 2.6 |
| Gelatin | 0 | 0.8 | 1.0 | 0 | 0 | 0 | 0 | 0 |
| Whey protein concentrate | 0 | 0 | 0 | 1.3 | 0 | 0 | 0 | 0 |
| Gellan gum | 0 | 0 | 0 | 0 | 0 | 0 | 0.03 | 0.03 |
| Xanthan gum | 0.8 | 0.8 | 0.8 | 0.8 | 0.62 | 0.8 | 0.62 | 0.8 |
| Carboxy-methyl-cellulose | 0 | 0 | 0.1 | 0 | 0 | 0 | 0 | 0 |
| Locust bean gum | 0 | 0 | 0 | 0 | 0.02 | 0.02 | 0 | 0 |
| Sodium citrate | 0 | 0 | 0 | 0 | 0 | 0 | 0.1 | 0 |

Tap water was weighed out in a large, stainless steel bucket. The dry blend was added with high shear and stirred approximately 1 minute. Citric acid and potassium sorbate were added and stirred approximately 10 minutes. Melted butter was added and stirred 3–5 minutes. The cream was homogenized, pasteurized and cooled using MicroThermics UHT/HTST Lab-25HV Hybrid unit with the following settings: Preheater Temperature: 210° F. Final Heater Temperature: 285–290° F. Homogenizer: 2000 psi $1^{st}$ stage/500 psi $2^{nd}$ stage (2500 psi total). Flow Rate: 1000 ml/minute. Hold Time: 6 seconds. The finished creams were captured into 2000 ml non-sterile plastic bottles and placed in the refrigerator until evaluated.

The creams were evaluated using the tests described below.

Cold Evaluation—Creams were evaluated at refrigerator temperature for visual appearance, texture when pouring or spooning, and taste. All of the creams were significantly cleaner in taste than the current refrigerated commercial products. Although processed aseptically, the creams contained preservatives and were stored under refrigeration because they had not been packaged aseptically. Refrigeration allowed evaluation of the texture of the creams as they would appear after the initial opening and subsequent refrigerated storage. The creams varied from a thick creamy pourable liquid to a set gelatin texture. The gelatin-containing creams had a firm gel that formed a curd-like texture when stirred with a spoon and a thick, sour cream texture when sheared with a hand blender.

Hot Product Evaluation—500 g of each cream was brought to a boil using an induction cook surface, boiled for 60 seconds, and then tasted hot. Flow properties were evaluated using a Bostwick Consistometer (measuring the distance the cream substitute flowed after 10 seconds) when the boiled cream reached 150° F. All creams were very clean tasting when evaluated warm. Physical differences between the hot creams were minimal, with all flowing between 10 and 13 cm in 10 seconds.

Hot Acid Functionality Testing—300 g of cream substitute was heated to boiling using an induction cook surface, and then 200 mls of 5% white vinegar were added and stirred into the cream substitute. The cream/vinegar blend was boiled for 4 minutes or until the mixture curdled. If the mixture remained uncurdled, 100 g of canola oil was blended in with a wire whisk to form a crude emulsion. The mixture was boiled another 2 minutes and then visually evaluated for emulsion stability. This test was used to simulate very extreme conditions, which a cream substitute should never see in a culinary environment. Several of the cream substitutes performed exceptionally well despite the harshness of the test. Creams E, F, and H and a 50:50 blend of F/H passed this test acceptably, showing good stability and emulsifying capability under hot acid conditions. The current refrigerated commercial products did not pass this test, exhibiting significant curdling when the acid was added and subsequent inability to emulsify oil.

Butter Stability Test—339 g of cold salted butter was cut into ~1 tablespoon pats. 113 g of cream substitute was placed into a saucepan, the butter added, and the mixture was heated gently on an induction cook surface while whisking lightly to incorporate the butter. If the cream was able to incorporate the butter successfully during the initial melting period, then the sauce was brought to a boil (simulating abuse conditions) and held there for 30 seconds. Sauces were evaluated for functionality and stability while heating and cooking as well as the finished consistency of the sauce. This test was the most critical evaluation of the prototype cream substitutes. A cream substitute is expected to emulsify the melting butter as the fat melts and is whisked into the cream, and the finished sauce is expected to have a very rich, thick creamy texture when completed. Cream substitutes provide an advantage over the traditional reduced dairy cream because the finished sauces are much more robust, meaning they are able to be brought to a boil without breaking and to be held at serving temperatures for long periods of time without separation of the fat from the balance of the sauce. Creams F and H performed exceptionally in this test, producing sauces that were very thick and creamy.

Applications Testing—Two cream substitutes that most successfully passed this battery of tests were made into a variety of cream sauces, soup, compound butters and dessert applications to evaluate their performance. Cream H, with a pourable texture and containing 0.8% xanthan gum and 0.03% gellan gum, and cream F, with a slightly set texture and containing 0.8% xanthan gum and 0.02% locust bean gum, along with Minor's Culinary Cream™ as the control, were made into a lemon-herb compound butter, three cold-blend sauces (alfredo, dijonnaise, and hollandaise), creme anglaise dessert sauce, creme brulee, and a cream-style tomato soup.

| Lemon Butter | |
|---|---|
| Unsalted Butter | ¾ lb |
| Minced Lemon rind | 3 tsp |
| Cream Substitute | 114 gms |
| Lemon Juice | 3 tbsp |
| Salt | 1 tsp |
| Pesto Sauce | 2 tsp |
| Cold Blend Alfredo Sauce | |
| Cream Substitute | 2 cups |
| 2% Milk | ¼ cup |
| Grated Parmesan | 1 cup |
| Salt | ¼ tsp |
| Pepper | ⅛ tsp |
| Chicken Stock | ¼ cup |
| Dijonaisse | |
| Cream Substitute | 1 cups |
| Dijon Mustard | ¾ cup |
| Raspberry Vinegar | 3 tsp |
| Pepper | pinch |
| Hollandaise | |
| Egg Yolks | 4 |
| Cream Substitute | ⅓ cup |
| Lemon Juice | 2 tbsp |
| Salt | 1 tsp |
| Cayenne pepper | pinch |
| Melted unsalted butter | 12 oz. |
| Crème Anglaise | |
| Egg Yolks | 4 |
| Sugar | ½ cup |
| 2% Milk | 1 cup |
| Cream Substitute | 1 cup |
| Vanilla extracts | 2 tsp |
| Creme Brulée | |
| Whole Egg | 1.5 each |
| Yolk | 2 each |
| Sugar | ⅛ cup |
| 2% Milk | ¾ cup |
| Cream Substitute | ¾ cup |
| Vanilla extracts | 1 tsp |
| Tomato Soup | |
| Butter | 1 tbsp |
| Diced Onions | ½ cup |
| Diced plum tomatoes | 13 oz |
| Crushed tomatoes in puree | 16 oz |
| Pesto sauce | 1 tbsp |
| Chicken stock | 16 oz |
| Cream Substitute | 1 cup |
| Salt | 1 tsp |
| Pepper | 1/16 tsp |

These were evaluated during preparation for overall cooking/use performance, and in the finished food product for visual appearance, taste and textural differences, and overall suitability in these applications. The compound butter and sauces were served on pasta or chicken breast pieces, the crème brulée evaluated after cooking and cooling, and the creme anglaise was evaluated on poached pears. Both cream substitutes outperformed the Minor's product in every application tested except the compound butter, and the variation in performance of the creams were minimal. Generally, cream H produced a slightly less viscous texture than cream F and the Minor's control. This was most evident in the compound butter, where cream H produced the softest texture (cutable, but almost spreadable), followed by cream F producing an intermediate stiffness and the Minor's Culinary Cream producing the stiffest, most cutable product.

Creams F and H had better overall taste and equal to or enhanced functionality versus the control. Creams F and H reduce the cost of the current commercially available refrigerated cream substitutes by eliminating ingredients and reducing costs of packaging, storage, and distribution. The aseptic cream substitute does not require a cold chain from place of manufacture to shelf, and in particular to foreign counties.

I claim:

1. An aseptic cream substitute comprising a composition of water, a dry blend, and a meltable oil or fat, wherein the dry blend comprises microparticulated and denatured whey protein concentrate and xanthan gum, wherein the composition is pasteurized and then homogenized to produce the aseptic cream substitute.

2. The aseptic cream substitute of claim 1 wherein the aseptic cream substitute is packaged under aseptic conditions.

3. The aseptic cream substitute of claim 1 wherein the composition comprises about 65 wt % to about 80 wt % water.

4. The aseptic cream substitute of claim 1 wherein the composition comprises about 3 wt % to about 6 wt % of a dry blend.

5. The aseptic cream substitute of claim 1 wherein the composition comprises about 10 wt % to about 45 wt % meltable vegetable oil or fat.

6. The aseptic cream substitute of claim 1 wherein the meltable oil or fat is butter.

7. The aseptic cream substitute of claim 1 wherein the meltable oil or fat is unsalted butter.

8. The aseptic cream substitute of claim 1 wherein the dry blend comprises about 50 wt % to about 90 wt % microparticulated and denatured whey protein concentrate.

9. The aseptic cream substitute of claim 1 wherein the dry blend comprises about 65 wt % to about 85 wt % microparticulated and denatured whey protein concentrate.

10. The aseptic cream substitute of claim 1 wherein the dry blend comprises about 70 wt % to about 83 wt % microparticulated and denatured whey protein concentrate.

11. The aseptic cream substitute of claim 1 wherein the dry blend comprises about 73 wt % to about 80 wt % microparticulated and denatured whey protein concentrate.

12. The aseptic cream substitute of claim 1 wherein the dry blend comprises about 10 wt % to about 30 wt % xanthan gum.

13. The aseptic cream substitute of claim 1 wherein the dry blend comprises about 15 wt % to about 28 wt % xanthan gum.

14. The aseptic cream substitute of claim 1 wherein the dry blend comprises about 20 wt % to about 25 wt % xanthan gum.

15. The aseptic cream substitute of claim 1 wherein the dry blend further comprises an effective amount of a stabilizer, a thickener, or both.

16. The aseptic cream substitute of claim 15 wherein the stabilizer or thickener is selected from the group consisting of locust bean gum, guar gum, gellan gum, cellulose or cellulose derivatives, alginates, carrageenan, gelatin, gum arabic, gum tragacanth, and tara gum.

17. The aseptic cream substitute of claim 15 wherein the stabilizer or thickener is locust bean gum.

18. The aseptic cream substitute of claim 1 wherein the dry blend further comprises about 1 wt % to about 50% protein selected from the group consisting of standard whey protein concentrate, soy protein concentrate, gelatin, and caseins.

19. The aseptic cream substitute of claim 1 wherein the dry blend further comprises about 5 wt % to not more than about 25% protein selected from the group consisting of standard whey protein concentrate, soy protein concentrate, gelatin, and caseins.

20. An aseptic cream substitute comprising a composition of about 65 wt % to about 80 wt % water, about 3 wt % to about 6 wt % of a dry blend, and about 10 wt % to about 45 wt % unsalted butter, wherein the dry blend comprises about 73 wt % to about 80 wt % microparticulated and denatured whey protein concentrate and about 20 wt % to about 25 wt % xanthan gum, wherein the composition is homogenized and then pasteurized to produce the aseptic cream substitute.

21. The aseptic cream substitute of claim 20 wherein the dry blend further comprises locust bean gum.

22. The aseptic cream substitute of claim 20 wherein the dry blend further comprises about 5 wt % to not more than about 25% protein selected from the group consisting of standard whey protein concentrate, soy protein concentrate, gelatin, and caseins.

23. A foodstuff comprising the cream substitute of claim 1.

* * * * *